UNITED STATES PATENT OFFICE.

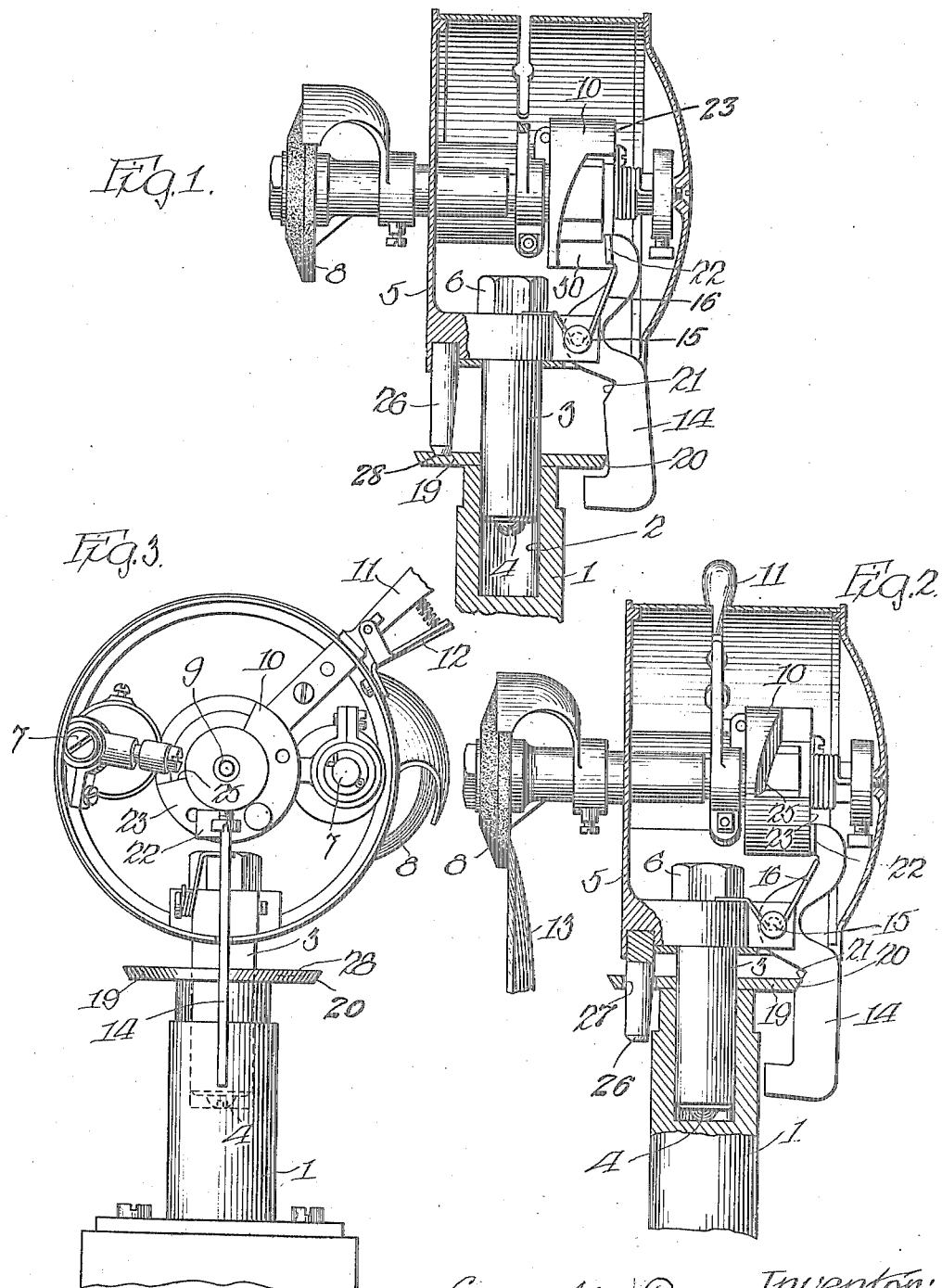

CORNELIS F. M. van BERKEL, OF LAPORTE, INDIANA, ASSIGNOR TO U. S. SLICING MACHINE COMPANY, OF LAPORTE, INDIANA, A CORPORATION OF INDIANA.

SHARPENER FOR SLICING-MACHINES.

1,291,285.	Specification of Letters Patent.	Patented Jan. 14, 1919.

Application filed June 4, 1917. Serial No. 172,633.

*To all whom it may concern:*

Be it known that I, CORNELIS F. M. VAN BERKEL, a subject of the Queen of the Netherlands, and a resident of Laporte, county of Laporte, and State of Indiana, have invented certain new and useful Improvements in Sharpeners for Slicing-Machines, of which the following is a specification.

This construction has for its object the provision of a device of the class named which shall be of improved construction and more efficient in operation than similar devices previously known.

The invention is exemplified in the combination and arrangement of parts shown in the accompanying drawing and described in the following specification and it is more particularly pointed out in the appended claims.

In the drawing, Figure 1 is a vertical sectional view of a sharpener embodying one form of the present invention; Fig. 2 is a view similar to Fig. 1 showing the sharpener in a different position from that shown in Fig. 1, and Fig. 3 is an elevation looking from the right in Fig. 2 but with the rear cover for the casing removed.

The particular embodiment of the invention shown in the drawing is illustrated as applied to a sharpener similar to that described in Patent No. 1,039,210 issued September 24, 1912. The sharpener there shown is carried by a casing which may be raised to lift the grinding wheels away from the slicing knife and then rotated to remove the wheels entirely from their position adjacent the knife into an inoperative position. Mechanism comprising springs and a cam is provided for bringing the grinders into and away from contact with the knife. It is apparent that if the casing is swung into and out of position at a time when the grinders are drawn toward one another in the position they occupy while grinding, that there is danger of marring the knife edge. The present invention makes it impossible to shift the casing in such a manner that the edge of the knife will be spoiled. Referring to the figures of the drawing, the numeral 1 designates a supporting post secured to the frame of the machine for carrying the grinding mechanism, the post being bored at its upper end to form a cylindrical opening 2 in which the standard 3 of the grinder casing operates. The standard 3 is cylindrical and moves freely in the opening 2, and an adjustable screw 4 is provided in the lower end of the standard to regulate the height of the casing when the lower end of the standard rests on the bottom of the opening 2. The casing 5 of the grinder is secured to the upper end of the standard 3 by means of a nut 6 and carries a pair of spindles 7 which are provided at their forward ends with grinding wheels 8 of the usual construction, as shown in the patent referred to. Between the spindles 7 is a cam shaft 9 which carries a cam 10, by means of which the spindles 7 and their grinding wheels 8 are shifted in the direction of their axes, to bring the wheels into contact with the opposite faces of the slicing knife during a sharpening operation, and to move them away from the knife when the sharpening is completed. The cam 10 is operated by a handle 11 which extends through the wall of the casing and is provided with a detent 12 for holding it in different adjusted positions.

Figs. 2 and 3 show the cam lever in a position in which the grinder wheels are in contact with the knife blade 13. The wheels are forced into contact with the knife by means of springs, as described in the patent referred to, and when the lever 11 is moved to the left (Fig. 3) the operating surfaces of the cam 10 positively force the wheels away from the knife blade against the tension of these springs. It will be apparent, from an inspection of Fig. 2, that if the casing were raised while the wheel 8 is being pressed against the edge of the blade 13, that as soon as the grinder reaches the edge of the blade, it will be drawn inwardly by its spring across the edge and thus mar the cutting edge.

To prevent these improper operations of the sharpener, a lever 14 is pivoted at 15 to the casing of the sharpener and a spring 16 is provided, which tends normally to rotate the lever 14 about its pivot in a clockwise direction as viewed in this figure. A disk 19 is secured to the upper end of the post 1 and has its periphery beveled to form a bearing surface 20 coöperating with a notch 21 in the inner edge of the lever 14. The lever 14 is provided at its upper end with a bearing foot 22 arranged to bear against the lateral surface 23 of the cam 10. In the position shown in Figs. 2 and 3, it will be seen that the notch 21 of the lever 14 is held in engagement with the bearing surface 20 of the disk 19, by means of the bearing foot 22, which rests against the surface of the cam 23. It will be evident that it is impossible to lift the casing 5 while the lever 14 is held in this position, because of the contact between the notch 21 and the outer periphery of the disk 19. This makes it impossible to raise the casing while the grinder wheels 8 are in engagement with the knife 13. When the lever 11 is rotated to the left in Fig. 3, the opening 25 in the cam 10 is brought to a position opposite the bearing foot 22, and when this occurs the operator may grasp the lower end of the lever 14 and draw it outwardly a sufficient amount to permit it to free the periphery of the disk 19, and thus permit the grinder casing to be raised. It will be remembered, however, that the movement of the lever 11 which freed the bearing foot 22 also shifted the grinders 8 away from the knife 13 so that they were free from contact with the knife before it was possible to lift the casing, thus there is no danger of destroying the edge of the knife when the casing is raised. The position of the lever 14 after the casing has been lifted is shown in Fig. 1. It should be noted that the casing may be held in its uppermost position by a pin 26 extending downwardly from the casing and arranged to rest upon the upper surface of the disk 19, as shown in Fig. 1. This pin extends through an opening 27 in the disk when the casing is in its lower position and thus secures the grinders 18 in proper position angularly about the axis of the standard 3 to coöperate with the blade 13 for sharpening.

A depression 28 is provided in the upper surface of the disk 19 to assist in locating the casing in its inoperative position with the grinders shifted away from the slicing knife. Since there is only one opening 27 through the disk 19, it is impossible to lower the casing and the grinders until the grinders are in the proper angular position relative to the knife. It is also impossible to shift the lever 11 into the position shown in Figs. 2 and 3, until the casing has been lowered to bring the grinders below the level of the upper edge of the knife, and into position to move laterally into engagement with the sides of the blade. This latter result is accomplished, as shown in Fig. 1, by means of the upper end of the lever 14 which is held in a position opposite the flat shoulder 30 at one side of the opening 25 in the cam 10. The lever 14 thus forms a lock to prevent rotation of the cam 10 while the casing is in its upper position. The lever is held in place to lock the cam because of the fact that its inner edge bears against the periphery 20 of the disk 19, as shown in Fig. 1. When the casing has been moved to its lowermost position the periphery of the disk enters the notch 21, as previously explained, and thus moves the upper end of the lever 22 away from the shoulder 30 of the cam 10 and frees the cam, so that it may be rotated by the lever 11 to move the grinder shafts 7 and their respective grinder wheels 8 in the direction of their axes to bring the grinders against the lateral face of the blade.

It will thus be seen, that where the present invention is employed it is impossible to move the grinders into contact with the blade in any way other than against the lateral faces of the blades to bring the grinders into proper position for sharpening. It is also impossible to move the grinders out of contact with the blade except by the reverse of the movement by which they are brought into contact, that is by moving them directly away from the faces of the blade in the direction of the axes of the grinders. In this way all danger of marring the cutting edge of a blade is absolutely removed.

I claim:—

1. In combination, a grinder for a slicing knife, a support for said grinder movable into and out of operative position relative to said knife, means for shifting said grinder into and out of operative position relative to said support, and means for preventing movement of said grinder into operative position relative to said support when said support is in inoperative position relative to said knife.

2. In combination, a grinder for a slicing knife, a support for said grinder, said support being movable in the direction of the plane of said knife, and an adjustable device for limiting the movement of said support toward the axis of said knife.

3. In combination, a grinder for a slicing knife, a cam for shifting said grinder relative to said knife, and a lock for preventing operation of said cam when said grinder is in improper position relative to said knife to be shifted by said cam.

4. In combination, a slicing machine frame for supporting a slicing knife, a grinder for the knife on said frame, a support for said grinder mounted on said frame and movable relative thereto to bring said grinder into and out of a position opposite said knife, means for moving said grinder relative to said support for bringing said grinder into and out of contact with said knife, and an interlocking device arranged to prevent movement of said support to shift said grinder away from said knife when said grinder is in contact with said knife and also arranged to prevent movement of said grinder relative to said support into position to contact with said knife when said support is moved to bring said grinder away from said knife.

5. In combination, a slicing machine frame, a grinder support movable relative to said frame, a grinder carried by said support, a cam for shifting said grinder relative to said support, a stop secured to said frame, a lever pivotally mounted on said support and having one end arranged to contact with said stop to hold said support from movement relative to said frame and having its opposite end arranged to contact with said cam to hold the first-mentioned end in operative position relative to said stop when said cam is in one position, said lever being movable into position to lock said cam and release said support from said stop when said cam is in another position.

6. A sharpener for a slicing knife comprising a support, a grinder carried by said support and movable relative to said support into and out of engagement with said slicing knife, a cam for controlling the movement of said grinder, means for adjustably holding said support, and an interlocking device between said holding means and said cam so that the adjustment of said support and the movement of said cam are reciprocally controlled one by the other.

7. In combination, a slicing machine frame, a grinder support carried by said frame and movable vertically relative thereto and also rotatably thereon, a grinder mounted on said support, mechanism for moving said grinder relative to said support into and out of operative position, and a locking lever for controlling the vertical movement of said grinder support and also the mechanism for shifting said grinder so that the movements of said parts are confined to a predetermined sequence.

8. In combination, a slicing machine frame, a standard on said frame, a grinder support carried by said standard and movable vertically and pivotally thereon, a grinder carried by said support, mechanism for shifting said grinder into and out of operative position, means for preventing rotation of said support when said support is in one position of vertical adjustment and for preventing vertical movement of said support when said support is in one position of pivotal adjustment, and a lever for preventing movement of said grinder relative to said support when said support is in one position of vertical adjustment and for preventing vertical adjustment of said support when said grinder is in one position of adjustment relative to said support.

9. In combination, a slicing machine frame having a standard thereon, a grinder support mounted on said standard and adjustable vertically and pivotally relative thereto, a disk for controlling the pivotal movement of said support on said standard, a grinder carried by said standard, a cam for shifting said grinder into and out of operative position, and a lever coöperating with said disk and cam for controlling the sequence of movement of said support on said standard and said grinder relative to said standard.

10. In combination, a slicing machine frame having a standard thereon, a grinder support vertically and pivotally movable on said standard, a lever pivoted to said support and movable therewith, a grinder carried by said support, and mechanism for shifting said grinder relative to said support, said lever having one end thereof arranged to coöperate with said shifting mechanism and the other end arranged to engage said standard so that the operation of said mechanism for shifting said grinder and the movement of said support upon said standard are controlled by said lever and made to depend one upon the other.

11. In combination, a frame for supporting a slicing knife, a standard carried by said frame, a grinder support mounted on said standard and adjustable vertically and pivotally relative thereto, a disk on said standard having an opening therein for holding said support against pivotal movement when said support is in a given position of vertical adjustment, means for preventing downward movement of said support when said support is in a given position of angular adjustment, a grinder carried by said support, a cam for shifting said grinder relative to said support into and out of engagement with said knife, and a lever pivotally carried by said support and having one end thereof arranged to engage said cam and the other end thereof arranged to engage said disk so that said lever will prevent rotary movement of said cam when said support is in one position of vertical adjustment and will prevent vertical movement of said support when said grinder is held by said cam in a given position relative to said support.

In testimony whereof I have signed my name to this specification, on this 2d day of June A. D 1917.

CORNELIS F. M. van BERKEL.